United States Patent
Sung et al.

(10) Patent No.: US 6,464,773 B1
(45) Date of Patent: Oct. 15, 2002

(54) TOLUENE SULFONIC ACID SWELLING OF PERYLENE PIGMENTS

(75) Inventors: Edward H. Sung, Cincinnati; George H. Robertson, Loveland; Chris M. Arizo, Maineville, all of OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/710,272

(22) Filed: Nov. 10, 2000

(51) Int. Cl.$^7$ .................................................. C09B 67/14
(52) U.S. Cl. ....................................... 106/493; 106/503
(58) Field of Search ................................ 106/493, 499, 106/503

(56) References Cited

U.S. PATENT DOCUMENTS

| | | | | |
|---|---|---|---|---|
| 2,770,629 A | | 11/1956 | Eates ........................ 260/314.5 |
| 3,628,976 A | * | 12/1971 | Stocker ....................... 106/278 |
| 3,801,591 A | | 4/1974 | Jackson .................... 260/314.5 |
| 4,432,796 A | | 2/1984 | Santimauro .................. 106/19 |
| 4,505,858 A | * | 3/1985 | Mayer ............................ 540/1 |

* cited by examiner

Primary Examiner—Anthony J. Green
(74) Attorney, Agent, or Firm—Sidney Persley

(57) ABSTRACT

A method of acid swelling crude perylene pigment by treating the crude with about 2 to 10 parts by weight of toluene sulfonic acid at an elevated pressure and at temperatures ranging from 40 to 140° C.

9 Claims, No Drawings

TOLUENE SULFONIC ACID SWELLING OF PERYLENE PIGMENTS

FIELD OF THE INVENTION

This invention relates to a method for conditioning, by acid swelling, crude perylene pigment using low concentrations of toluene sulfonic acid at a particular range of temperature, and more particularly to an improved process of finishing perylene pigment in a finely-divided form exhibiting high tinctorial strength and tinctorial stability in lacquers and in coloration of plastics.

BACKGROUND OF THE INVENTION

It is conventional to condition crude organic pigment such as phthalocyanine, quinacridone, perylene, carbazole violet by a method known as acid swelling. Crude pigment is generally unsuitable for use as pigment and typically must undergo finishing treatments to modify its particle size and crystal structure so as to make it pigmentary grade. Such a process involves mixing crude pigment in sulfuric acid of certain concentration. With such concentrations of acid, the crude pigment does not dissolve nor is it crystallize but is caused to swell and after removal of the liquid and drying, the pigment becomes a soft textured product having a very fine particle size. The amount of acid used in this treatment must be sufficient to obtain a stirrable slurry. Generally, a ratio on the order of one part by weight of crude pigment to 10 to 20 parts by weight of acid has been found to produce satisfactory results.

In all cases, the method of acid swelling requires significant amounts of acid which unavoidably increases production cost in order providing an efficient agitation and effective transfer from the acid swelling reactor, for example, to a digestive solvent or water for further treatment.

SUMMARY OF THE INVENTION

The present invention provides a method of conditioning crude perylene pigment comprising treating 1 part by weight of the crude pigment with about 2 to 10 parts by weight of toluene sulfonic acid at temperatures ranging from about 40 to 140° C., thereby generating an acid swelled perylene pigment.

Other objects and advantages of the invention will become apparent from the following description and appended claims.

DETAILED DESCRIPTION OF THE INVENTION

It has now surprisingly been found that the conditioning of crude perylene pigment can be achieved in a high energy mixer through acid swelling the crude in about 2 to 10 parts, by weight, preferably about 3 to 5 parts by weight, of toluene sulfonic acid at temperatures ranging from about 40 to about 140° C. The resulting pigment-phosphate salt can then be digested in water or in a water miscible organic solvent, to provide a finely-divided product exhibiting high tinctorial strength and excellent dispersibility in lacquers and in coloration of plastics.

Suitable toluene sulfonic acid for the process of the invention include toluene sulfonic acid monohydrate, toluene sulfonic acid anhydride.

Toluene sulfonic acid is added and heated in a glass-lined reactor and crude pigment is then charged to obtain a stirrable mixture. The amount of toluene sulfonic acid is approximately 2–10 fold of crude, preferably 3 to 5 fold by weight.

The amount of acid added will determine the physical appearance of the resulting mixture which must remain fluid enough to provide a stirrable medium. Higher amounts of toluene sulfonic acid do not harm product quality but adds significantly to production cost. The toluene sulfonic acid can be mixed with crude through a blender to form a uniform mixture and the resulting mass is allowed to set in an oven. This procedure provides equally good material.

The toluene sulfonic acid mixture is generally heated to a temperature of from about 40 to 140° C., more particularly 50 to 120° C., for about 2 to 12 hours, and more preferably at 6 to 10 hours. The time for heating will depend on the solvent selection and pigment. The crude pigment reacts with toluene sulfonic acid to form a very dense or less dense mixture depending on toluene sulfonic acid and crude ratio. Higher ratios of toluene sulfonic acid to crude provides better tinctorial strength. Lower swelling temperature also results in improved properties in both paints and plastics.

For further conditioning, the entire acid swelled medium is digested with cold water either through direct strike (i.e. adding the acid medium slowly into ice water) or by an indirect strike, (i.e. adding water into the acid medium). The amount of water used is preferably about 4 to 8 times by weight of the swelled pigment in the medium. The resulting water slurry is then filtered, washed with water until low conductivity is reached and the resulting presscake is reslurried into a water miscible organic reslurry solvent or water and heated at greater than atmospheric pressure, depending on the solvent selected, to a temperature of from 80 to 160° C., preferably 120–160° C. for about 2 to 6 hours.

Suitable reslurry solvents include lower alcohols, ketones, acids or other basic solvents, for example, methanol, ethanol, n-propabol, isopropanol, n-butanol, iso-butanol, pentanol, hexanol, acetone, methyl ethylketone, methylisobutylketone, glacial acetic acid, dimethylforamide, dimethylsulfoxide, N-methylpyrolidone, or mixtures thereof.

The following examples further illustrate details of this invention. The invention, which is set forth in the foregoing disclosure, is not to be limited in the art will readily understand that known variations of the conditions of the following procedures can be used. Unless otherwise noted, all temperatures are degrees Celsius and all part and percentages are by weight.

EXAMPLE 1

Toluene sulfonic acid (TSA, monohydrate, 250 g) was heated in a kettle to 115 to 120° C. until melted and perylene red 179 (83.3 g) was charged to the kettle at a rate of 10 g per 2 minutes. Upon completion of the charge, the mixture was stirred for 20 minutes and held at 115–120° C. for 2 hours. The reaction medium was allowed to solidify on cooling and reheated to 115 to 120° C. for another 6 hours to yield a conditioned pigment. Ice (500 g) and water (1L) were then added to the hot mixture with vigorous stirring. The resulting slurry was filtered and washed until it became a neutral presscake. The presscake was reslurried into three times its weight of water and placed in a pressure reactor. The slurry was heated to 140° C. under increased pressure for 4 hours cooled then treated with mineral spirits (80 g). The mixture was filtered, washed and dried to give a further conditioned perylene pigment product.

EXAMPLE 2

TSA (anhydrous, 240 g) was heated to 75° C. with continuous stirring and perylene red 179 (50 g) was charged at once. Upon completion of the charge, the mixture was held at 75° C. for 6 hours to yield a conditioned pigment. Ice (500 g) and water (1L) were then added to this hot mixture with vigorous stirring. The resulting slurry was filtered and washed until it became a neutral presscake. The presscake was reslurried into three times its weight of water and placed in a pressure reactor. The slurry was heated to 140° C. under increased pressure for 4 hours. After cooling the slurry treated with mineral spirits (50 g). The mixture was filtered, washed and dried to give a further conditioned organic pigment product.

EXAMPLE 3

TSA (anhydrous, 240 g) and perylene red 179 (43.2 g) were added to a mixer then stirred at high speed for 2 minutes and transferred to a glass beaker. The mixture was heated to 75° C. and held at 75° C. for 8 hours to yield a conditioned pigment. The hot medium was then poured into a solution containing ice (750 g) and water (0.75L) under vigorous stirring. The resulting slurry was filtered and washed until it became a neutral press. The presscake was reslurried into three times its weight of water and placed in a pressure reactor. The slurry was then heated to 140° C. under increased pressure for 4 hours, cooled, then treated with mineral spirits (40 g). The mixture was filtered, washed and dried to give a further conditioned organic product.

The pigments obtained by the method of the present invention, as described in Examples 1 to 3, possess high tinctorial strength, pure shade and good dispersibility in lacquers and in the coloration of plastics.

The invention has been described in terms of preferred embodiments thereof, but is more broadly applicable as will be understood by those skilled in the art. The scope of the invention is only limited by the following claims.

What is claimed is:

1. A method of conditioning a crude perylene pigment comprising treating 1 part by weight of the crude pigment with about 2 to 10 parts by weight of toluene sulfonic acid at a temperature ranging from about 40 to 140° C., thereby generating an acid swelled pigment.

2. The method of claim 1, wherein the amount of toluene sulfonic acid is about 3 to 5 parts by weight.

3. The method of claim 1, wherein the conditioning is carried out at a temperature of about 50 to 120° C.

4. The method of claim 1, wherein the conditioning is carried out in about 2 to 12 hours.

5. The method of claim 4, wherein the conditioning is carried out in about 6 to 10 hours.

6. The method of claim 1, wherein the toluene sulfonic acid is toluene sulfonic acid monohydrate.

7. The method of claim 1, wherein the toluene sulfonic acid is toluene sulfonic acid anhydride.

8. The method of claim 1 further comprising digesting the acid swelled pigment in water or a water miscible organic solvent.

9. The method of claim 1 further comprising adding the acid swelled pigment to a reslurry solvent at an elevated temperature and pressure.

* * * * *